(12) United States Patent
Espinoza et al.

(10) Patent No.: US 7,012,104 B2
(45) Date of Patent: Mar. 14, 2006

(54) FISCHER-TROPSCH PROCESSES AND CATALYSTS MADE FROM A MATERIAL COMPRISING BOEHMITE

(75) Inventors: Rafael L. Espinoza, Ponca City, OK (US); Yaming Jin, Ponca City, OK (US); Kandaswamy Jothimurugesan, Ponca City, OK (US); Nithya Srinivasan, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 12 days.

(21) Appl. No.: 10/686,977

(22) Filed: Oct. 16, 2003

(65) Prior Publication Data

US 2004/0132833 A1 Jul. 8, 2004

Related U.S. Application Data

(60) Provisional application No. 60/419,073, filed on Oct. 16, 2002.

(51) Int. Cl.
*C07C 27/00* (2006.01)

(52) U.S. Cl. ............... 518/715; 518/713; 518/714; 518/719; 518/720; 518/721

(58) Field of Classification Search ............ 518/700, 518/713, 714, 715, 719, 720, 721
See application file for complete search history.

(56) References Cited

U.S. PATENT DOCUMENTS

| | | | |
|---|---|---|---|
| 2,892,858 A | 6/1959 | Ziegler | |
| 3,852,190 A | 12/1974 | Buss et al. | |
| 3,894,963 A | 7/1975 | Gerdes et al. | ............ 252/464 |
| 4,012,313 A | 3/1977 | Buss et al. | |
| 4,063,851 A | 12/1977 | Weldon | |
| 4,224,192 A | 9/1980 | Foster et al. | |
| 4,387,085 A | 6/1983 | Fanelli et al. | |
| 4,602,000 A | 7/1986 | Dupin et al. | |
| 4,617,183 A | 10/1986 | Lewis et al. | |
| 4,708,945 A | 11/1987 | Murrell et al. | |
| 4,744,974 A | 5/1988 | Lewis et al. | |
| 4,831,007 A | 5/1989 | Murrell et al. | |
| 4,891,127 A | 1/1990 | Murrell et al. | |
| 5,055,019 A | 10/1991 | Meyer et al. | |
| 5,102,851 A | 4/1992 | Eri et al. | |
| 5,116,879 A | 5/1992 | Eri et al. | |
| 5,134,107 A | 7/1992 | Narula | |
| 5,232,580 A | 8/1993 | Le et al. | |
| 5,837,634 A | 11/1998 | McLaughlin et al. | |
| 5,874,381 A | 2/1999 | Bonne et al. | |
| 6,063,358 A | 5/2000 | Lindquist et al. | |
| 6,224,846 B1 | 5/2001 | Hurlburt et al. | |
| 6,255,358 B1 | 7/2001 | Singleton et al. | |
| 6,262,132 B1 | 7/2001 | Singleton et al. | |
| 6,271,432 B1 | 8/2001 | Singleton et al. | ............ 585/700 |
| 6,303,531 B1 | 10/2001 | Lussier et al. | |
| 6,503,867 B1 | 1/2003 | Stamires et al. | ............ 502/335 |
| 6,806,226 B1 | 10/2004 | Van Berge et al. | |
| 6,835,690 B1 | 12/2004 | Van Berge et al. | |
| 2002/0155946 A1 | 10/2002 | Bogdan et al. | |
| 2003/0032554 A1 | 2/2003 | Park et al. | |
| 2003/0162849 A1 | 8/2003 | Van Berge et al. | |
| 2004/0186188 A1 | 9/2004 | Van Berge et al. | |

FOREIGN PATENT DOCUMENTS

| | | |
|---|---|---|
| GB | 640965 | 8/1950 |
| GB | 2 352 194 A | 1/2001 |
| WO | WO 99/42214 | 8/1999 |
| WO | WO 00/45948 | 8/2000 |
| WO | WO 01/76735 A1 | 10/2001 |
| WO | WO 01/87480 A1 | 11/2001 |
| WO | WO 02/07883 A2 | 1/2002 |
| WO | WO 03/012008 A2 | 2/2003 |
| ZA | 2001/6213 | 7/2001 |

OTHER PUBLICATIONS

PCT International Search Report for International Application No. PCT/US03/32801 dated Mar. 4, 2004 (2 p.).
Database CAPLUS on STN Chemical Abstract (Columbus Ohio, USA) CA:2000: 795147, Loosdrecht et al., *Support Modification for Cobalt Based Slurry Phase Fischer-Tropsch Catalyst*, American Chemical Society. (2000), 220th, Fuel-048, see abstract.
M. Absi-Halabi, et al.; "Studies on Pore Size Control of Alumina: Preparation of Alumina Catalyst Extrudates with Large Unimodal Pore Structure by Low Temperature Hydrothermal Treatment"; Preparation of Catalysts V, 1991 Elsevier Science Publishers B.V., Amsterdam, pp. 155-163.
Rong-Sheng Zhou, et al.; "Structures and Transformation Mechanisms of the η, γ and θ Transition Aluminas"; International Union of Crystallography 1991; Institute for Ceraminc Superconductivity, New York State College of Ceramics, Alfred University, Alfred, NY 14802, USA; pp. 617-630.
Richard L. Smith, et al.; "The Influence of Diaspore Seeding and Chlordie Concentration on the Transformation of 'Diasporic' Precursors to Corundum"; Journal of the American Ceramic Society, Oct. 16, 2000; 31 pages.

(Continued)

*Primary Examiner*—J. Parsa
(74) *Attorney, Agent, or Firm*—Conley Rose P.C.

(57) ABSTRACT

A hydrothermally-stable catalyst, method for making the same, and process for producing hydrocarbon, wherein the catalyst is used in synthesis gas conversion to hydrocarbons. In one embodiment, the method comprises depositing a compound of a catalytic metal selected from Groups 8, 9, and 10 of the Periodic Table on a support material comprising boehmite to form a composite material; and calcining the composite material to form the catalyst. In other embodiments, the support material comprises synthetic boehmite, natural boehmite, pseudo-boehmite, or combinations thereof.

34 Claims, 3 Drawing Sheets

OTHER PUBLICATIONS

H.C. Stumpf, et al.; "Thermal Transformations of Aluminas and Alumina Hydrates"; Industrial and Engineering Chemistry, vol. 42, No. 7, Jul. 1950; pp. 1398-1403.

Shu-Hui Cai, et al.; "Atomic Scale Mechanism of the Transformation of γ-Alumina to θ-Alumina"; The American Physical Society 2002; Physical Review Letters, vol. 89, No. 23; Dec. 2, 2002; 4 pages.

Zhong-Wen Liu, et al.; "Partial Oxidation of Methane Over Nickel Catalysts Supported on Various Aluminas"; Korean J. Chem. Eng., vol. 19, No. 5, pp. 735-741 (2002).

Hyun-Seog Roh, et al.; "Partial Oxidation of Methane Over Ni/θ-Al$_2$O$_3$ Catalysts"; Chemistry Letters 2001; Mar. 19, 2001; pp. 666-667.

Hyun-Seog Roh, et al.; "Partial Oxidation of Methane Over Ni/Ce-ZrO$_2$/θ-Al$_2$O$_3$"; Korean J. CHem. Eng., vol. 19, No. 5; pp. 742-748 (2002).

Hiromichi Arai, et al.; "Thermal stabilization of catalysts supports and their application to high-temperature catalytic combustion"; Applied Catalysis A: General 138 (1996); pp. 161-176; Elsevier Science Publishers B.V., Amsterdam.

Bernard Beguin et al.; "Stabilization of alumina by addition of lanthanum"; Applied Catalysis A: General 138 (1996); pp. 161-176; Elsevier Science Publishers B.V., Amsterdam.

François Oudet, et al.; "Thermal Stabilization of Transition Alumina by Structural Coherence with LnAlO3 (Ln=La, Pr, Nd)"; Journal of Catalysts vol. 114; pp. 112-120 (1988).

H. Schaper, et al.; "The Influence of Lanthanum Oxide on the Thermal Stability of Gamma Alumina Catalyst Supports"; Applied Catalysis, vol. 7 (1983), pp. 211-220; Elsevier Science Publishers B.V., Amsterdam.

Jalajakumari Nair, et al.; "Pore Structure Evolution of Lanthana-Alumina Systems Prepared Through Coprecipitation"; J. Am Ceram. Soc., vol. 83, No. 8; pp. 1942-1946 (2000).

Hennie Schaper, et al.; "Thermal Stabilization of High Surface Area Lumina"; Solid State Ionics, vol. 16 (1985), pp. 261-266.

Xiaoyin Chen, et al.; "High temperature stabilization of alumina modified b lanthanum species"; Applied Catalysis A: General, vol. 205 (2001); pp. 159-172.

S. Subramanian, et al.; "Characterization of lanthana/alumina composite oxides"; Journal of Molecular Catalysis, vol. 69 (1991); pp. 235-245.

P. Souza Santos, et al.; "Standard Transition Aluminas. Electron Microscopy Studies"; Materials Research, vol. 3, No. 4; pp. 104-114, 2000.

E. Iglesia, et al.; "Computer-Aided Design of Catalysts," ed. E.R. Becker et al., p. 215-225, New York, Marcel Decker, Inc., 1993.

H. Pham, et al.; "The synthesis of attrition resistant slurry phase iron Fischer-Tropsch catalysts," Catalysis Today, vol. 58 (2000), pp. 233-240.

FISCHER-TROPSCH PROCESSES AND CATALYSTS MADE FROM A MATERIAL COMPRISING BOEHMITE

CROSS-REFERENCE TO RELATED APPLICATIONS

This non-provisional application claims the benefit of U.S. Provisional Application No. 60/419,073, filed Oct. 16, 2002, which is hereby incorporated by reference in its entirety.

STATEMENT REGARDING FEDERALLY SPONSORED RESEARCH OR DEVELOPMENT

Not Applicable.

FIELD OF THE INVENTION

The present invention relates to a method of making a catalyst by treating a support material comprising boehmite in the presence of a catalytic metal and more specifically to catalysts with enhanced hydrothermal stability and their use in processes comprising hydrothermal conditions, such as in the Fischer-Tropsch synthesis.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require energy, equipment, and the expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is converted into organic molecules containing carbon and hydrogen. Those organic molecules containing only carbon and hydrogen are known as hydrocarbons. In addition, other organic molecules containing oxygen in addition to carbon and hydrogen known as oxygenates may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reactor.

Typically, the Fischer-Tropsch product stream contains hydrocarbons having a range of numbers of carbon atoms, and thus having a range of molecular weights. Therefore, the Fischer-Tropsch products produced by conversion of natural gas commonly contain a range of hydrocarbons, which include gases, liquids and waxes. Depending on the product molecular weight distribution, different Fischer-Tropsch product mixtures are ideally suited to different uses. For example, Fischer-Tropsch product mixtures containing liquids may be processed to yield gasoline, as well as middle distillates. Hydrocarbon waxes may be subjected to an additional processing step for conversion to liquid and/or gaseous hydrocarbons. Consequently, in the production of a Fischer-Tropsch product stream for processing to a fuel, it is desirable to maximize the production of high value liquid hydrocarbons, such as hydrocarbons with at least 5 carbon atoms per hydrocarbon molecule ($C_{5+}$ hydrocarbons).

Typically, in the Fischer-Tropsch synthesis, the product spectra can be described by likening the Fischer-Tropsch reaction to a polymerization reaction with a Shultz-Flory chain growth probability, referred to as the alpha value ($\alpha$), that is independent of the number of carbon atoms in the lengthening molecule. The alpha value is typically interpreted as the ratio of the mole fraction of the $C_{n+1}$ product to the mole fraction of the $C_n$ product. An alpha value of at least 0.72 is desirable for producing high carbon-length hydrocarbons, such as those of diesel fractions.

The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, which is used throughout the present specification).

Cobalt metal is particularly desirable in catalysts used in converting natural gas to heavy hydrocarbons suitable for the production of diesel fuel. Alternatively, iron, nickel, and ruthenium have been used in Fischer-Tropsch catalysts. Nickel catalysts favor termination and are useful for aiding the selective production of methane from syngas. Iron has the advantage of being readily available and relatively inexpensive but has the disadvantage of a water-gas shift activity. Ruthenium has the advantage of high activity but is quite expensive.

Catalysts often further employ a promoter in conjunction with the principal catalytic metal. A promoter typically improves a measure of the performance of a catalyst, such as activity, stability, selectivity, reducibility, or regenerability.

Further, in addition to the catalytic metal, a Fischer-Tropsch catalyst often includes a support material. The support is typically a porous material that provides mechanical strength and a high surface area, in which the active metal and promoter(s) can be deposited. In a common method of loading a Fischer-Tropsch metal to a support, the support is impregnated with a solution containing a dissolved metal-containing compound. The metal may be impregnated in a single impregnation, drying and calcinations step or in multiple steps. When a promoter is used, an impregnation solution may further contain a promoter-containing compound. After drying the support, the resulting catalyst precursor is calcined, typically by heating in an oxidizing atmosphere, to decompose the metal-containing compound to a metal oxide. When the catalytic metal is cobalt, the catalyst precursor is then typically reduced in hydrogen to convert the oxide compound to reduced "metallic" metal. When the catalyst includes a promoter, the reduction conditions may cause reduction of the promoter or the promoter may remain as an oxide compound.

Catalyst supports for catalysts used in Fischer-Tropsch synthesis of hydrocarbons have typically been refractory oxides (e.g., silica, alumina, titania, zirconia or mixtures thereof). It has been asserted that the Fischer-Tropsch synthesis reaction is only weakly dependent on the chemical identity of the metal oxide support (see E. Iglesia et al. 1993, In: "Computer-Aided Design of Catalysts," ed. E. R. Becker et al., p. 215, New York, Marcel Dekker, Inc.). Nevertheless, because it continues to be desirable to improve the performance of Fischer-Tropsch catalysts, other types of catalyst supports are being investigated.

In particular, various aluminum oxide compounds have been investigated. For example, gamma-alumina is an oxide compound of aluminum having, in its pure form, the empirical formula, $\gamma$-$Al_2O_3$. Gamma-alumina is distinguished from other polymorphic forms of alumina, such as alpha-alumina ($\alpha$-$Al_2O_3$), by its structure, which may be detected for example by x-ray diffraction (see for example Zhou & Snyder, 1991, Acta Cryst., vol B47, pp 617–630) or by electron microscopy (see for example Santos et al., 2000, Materials Research, vol 3, No.4, pp 101–114). The structure of gamma-alumina is conventionally thought to approximate a spinel, with a cubic form or tetragonal symmetry or combination.

In a common method of producing gamma-alumina, naturally occurring bauxite is transformed to gamma-alumina via intermediates. Bauxite is an ore, which can be obtained from the earth's crust. Minerals commonly found in bauxite and the empirical formulas of their pure forms include gibbsite ($\alpha$-$Al_2O_3 \cdot 3H_2O$), boehmite ($\alpha$-$Al_2O_3 \cdot H_2O$), diaspore ($\beta$-$Al_2O_3 \cdot H_2O$), hematite ($\alpha$-$Fe_2O_3$), goethite ($\alpha$-FeOOH), magnetite ($Fe_3O_4$), siderite ($FeCO_3$), ilmenite ($FeTiO_3$), anatase ($TiO_2$), rutile ($TiO_2$), brookite ($TiO_2$), hallyosite ($Al_2O_3 \cdot 2SiO_2 \cdot 3H_2O$), kaolinite ($Al_2O_3 2SiO_2 \cdot 2H_2O$), and quartz ($SiO_2$).

In a first transformation, gibbsite is derived from bauxite. The Bayer process is a common process for producing gibbsite from bauxite. The Bayer process was originally developed by Karl Joseph Bayer in 1888 and is the basis of most commercial processes for the production of gibbsite. As it is conventionally carried out, the Bayer process includes digestion of bauxite with sodium hydroxide in solution at elevated temperature and pressure to form sodium aluminate in solution, separation of insoluble impurities from the solution, and precipitation of gibbsite from the solution.

In a second transformation, boehmite is derived from gibbsite. As disclosed above, gibbsite is a trihydrated alumina having, in its pure form, the empirical formula $\alpha$-$Al_2O_3 \cdot 3H_2O$. Transformation of gibbsite to boehmite may be accomplished by varying the conditions so as to influence the thermodynamic equilibrium to favor boehmite. For example, a method for producing boehmite from gibbsite may include dehydration in air at 180° C.

In a third transformation, gamma-alumina is derived from boehmite. Boehmite, in its pure form, has the empirical formula $\alpha$-$Al_2O_3 \cdot H_2O$. Alternately, it is denoted in the art by $\gamma$-AlO(OH). The respective $\alpha$ and $\gamma$ prefixes refer to the crystalline form. Boehmite is distinguished from other polymorphic forms of monohydrated alumina, such as diaspore ($\beta$-$Al_2O_3 \cdot H_2O$), by its structure, or crystalline form. In particular, boehmite typically has orthorhombic symmetry. Transformation of boehmite to gamma-alumina may be accomplished by varying the conditions so as to influence the thermodynamic equilibrium to favor gamma-alumina.

A support material is desirably stable. Under ambient (standard) conditions of temperature and pressure, such as for storage, gamma-alumina is less reactive, and therefore more stable than boehmite. Thus, gamma-alumina is typically regarded as a more desirable support material than boehmite. Further, calcination of boehmite to form gamma-alumina before loading catalytic metal to the gamma-alumina is generally regarded as a desirable step in the formation of a catalyst from boehmite. Thus, catalytic metal is typically not loaded to boehmite itself in forming a catalyst.

Despite the tendency of gamma-alumina to be stable at atmospheric conditions, gamma-alumina is known to exhibit a tendency to instability under hydrothermal conditions. For example, M. Abso-Haalabi, et al. in "Preparation of Catalysts V", ed. G. Poncelet, et al. (1991, Elsevier, Amsterdam, pp. 155–163) disclose that gamma-alumina undergoes an increase in average pore size and an accompanying decrease in surface area after hydrothermal treatment in the temperature range 150–300° C. Such a transformation would be undesirable in a catalyst. However, similar hydrothermal conditions occur, for example, in the Fischer-Tropsch process. In particular, in a Fischer-Tropsch process, water is produced during the Fischer-Tropsch reaction. The presence of water together with the elevated temperatures conventionally employed in the Fischer-Tropsch process create conditions in which hydrothermal stability, that is stability at elevated temperatures in the presence of water, is desirable. Fischer-Tropsch catalysts using $\gamma$-alumina supports are known to exhibit a tendency to hydrothermal instability under Fischer-Tropsch operating conditions. This instability tends to cause a decrease in performance of $\gamma$-alumina supported catalysts.

Consequently, there is a need for Fischer-Tropsch catalysts having superior stability. Further needs include a Fischer-Tropsch catalyst that is hydrothermally stable. Additional needs include a Fischer-Tropsch catalyst with increased performance.

SUMMARY OF THE INVENTION

These and other needs in the art are addressed in one embodiment by an inventive method for making a hydrothermally-stable catalyst suitable for use in synthesis gas conversion to hydrocarbons. The method comprises depositing a compound of a catalytic metal selected from Groups 8, 9, and 10 of the Periodic Table on a support material comprising boehmite to form a composite material; and calcining the composite material to form the catalyst.

In another embodiment, the invention comprises a process for producing hydrocarbons. The process comprises contacting a catalyst with a feed stream comprising carbon monoxide and hydrogen in a reaction zone, wherein the catalyst is made by a method comprising depositing a cobalt compound on a support material comprising boehmite so as to form a composite material, and calcining the composite material to form the catalyst; and converting at least a portion of the feed stream to hydrocarbon products with the catalyst.

In a third embodiment, the invention provides a catalyst with enhanced hydrothermal stability. The catalyst comprises a support comprising aluminum; a catalytic metal comprising iron, cobalt, or combinations thereof; and a promoter comprising platinum, palladium, ruthenium, rhenium, silver, boron, copper, lithium, sodium, potassium, or any combinations thereof; wherein the catalyst has a surface area and loses not more than 20% of its surface area when exposed to water vapor; and wherein the catalyst is made by a method comprising contacting a support material comprising boehmite with a catalytic metal-containing compound and a promoter compound so as to form a composite material; and calcining the composite material to obtain the catalyst.

In other embodiments, the invention provides support material comprising synthetic boehmite, natural boehmite, pseudo-boehmite, or combinations thereof. Further embodiments comprise calcining in a non-oxidizing atmosphere.

It will therefore be seen that a technical advantage of the present invention includes a hydrothermally stable Fischer-Tropsch catalyst, thereby eliminating problems encountered by using conventional supports. For instance, problems encountered with the catalysts exhibiting a tendency to hydrothermal instability are overcome. Further advantages include an increase in performance of the Fischer-Tropsch catalysts.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the present invention, reference will now be made to the accompanying drawings, in which.

DETAILED DESCRIPTION OF THE PREFERRED EMBODIMENT

Catalyst Support

Figure 1:
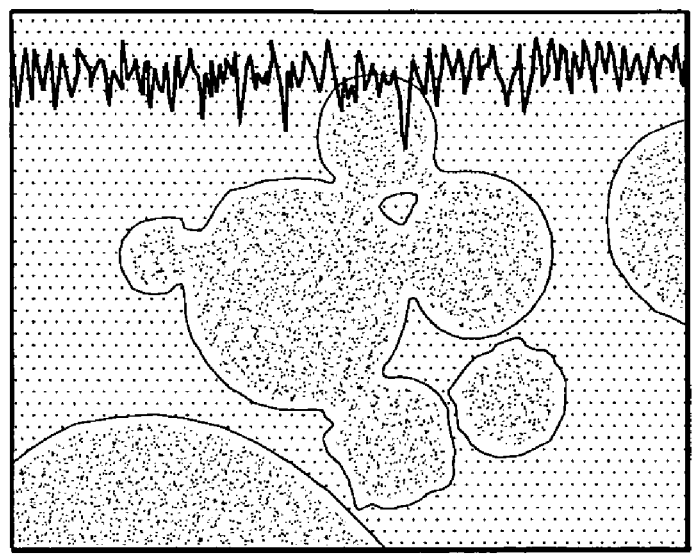
FIG. 1 is a Scanning Electron Microscopy (SEM) micrograph of a catalyst prepared by aqueous impregnation of dispersible boehmite.

According to a preferred embodiment of the present invention, a catalyst comprises a boehmitic support. The boehmitic support comprises boehmite. The boehmite comprises synthetic boehmite, natural boehmite, pseudo-boehmite, or combinations thereof, preferably synthetic boehmite. In alternative embodiments, the boehmitic support comprises an aluminum containing material derived by treatment of boehmite as part of a composite material that further includes catalytic metal. Preferably, the boehmite support does not comprise anhydrous alumina. Synthetic boehmite includes any boehmite not derived from ore. When the boehmite comprises synthetic boehmite, the synthetic boehmite can be made by any suitable process. Suitable processes for making synthetic boehmite are well known. Without limiting the invention, synthetic boehmite can be made by a gellation method. In particular, maturation of an $Al(OH)_3$ gel at pH>12 and about 80° C. produces synthetic boehmite. It is to be understood that minor variations, such as in impurities, may exist between various commercial sources of natural boehmite. Without limiting the invention, exemplary impurities include for example, elements or compounds derived from other materials contained in natural sources of boehmite. Thus, natural boehmite can comprise minor amounts of any one or combination of iron, titanium, and silicon. Pseudo-boehmite refers to a monohydrate of alumina having a crystal structure corresponding to that of natural or synthetic boehmite but having low crystallinity or ultra-fine particle size.

The boehmite is preferably porous. The average pore size is preferably larger than 4 nm. The average surface area, including the surface of the pores, is preferably larger than about 50 $m^2$/g. When the support is in the form of particles, the particles preferably have a size between about 20 microns and about 200 microns when the catalyst is intended for use in a slurry bed reactor. The average size of the particles is preferably between about 50 microns and about 90 microns when the catalyst is intended for use in a slurry bed reactor. The average size of the particles may be between about 70 microns and about 90 microns. Alternatively, particles of support have a size greater than about 0.5 mm, preferably greater than 1 mm, when the catalyst is intended for use in a fixed bed reactor.

The boehmite is preferably spray-dried boehmite. Alternatively, the boehmite can be extruded boehmite.

The boehmite material can be obtained as commercial boehmite, typically available as a powder having a specified particle size. For powders obtained with particle sizes outside a desired range, the particle sizes can be adjusted to a desired range. The particle sizes can be adjusted by any suitable method. Preferably, the powder is dispersed in a solvent such as water and spray dried to obtain a boehmite powder with a particle size in the desired range.

The boehmite is preferably non-dispersible in aqueous solution. A non-dispersible boehmite can be obtained from a dispersible boehmite by preheating the boehmite at temperatures between about 250° C. and about 350° C. for between about 20 minutes and about 24 hours, preferably in an oxidizing atmosphere. A temperature is preferably selected that is lower than the temperature for the formation of a γ-alumina phase. The dispersible boehmite can be a commercial boehmite, as received, or as modified. Without limiting the invention, commercial boehmite can be modified by spraying or treating without affecting dispersibility. According to some embodiments, the boehmite is dispersible, preferably in acid. The acid-dispersible boehmite can be a commercial acid-dispersible boehmite. It is believed by the present inventors that the acid dispersibility confers to the support a greater stability towards the presence of water, especially of steam.

Catalyst Composition

The present catalyst comprises a catalytic metal. The catalytic metal comprises a Fischer-Tropsch catalytic metal. In particular, the catalytic metal is preferably selected from among the Group 8 metals, such as iron (Fe), ruthenium (Ru), and osmium (Os); Group 9 metals, such as cobalt (Co), rhodium (Rh), and irridium (Ir); Group 10 elements, such as nickel (Ni), palladium (Pd), and platinum (Pt); and the metals molybdenum (Mo), rhenium (Re), and tungsten (W). The catalytic metal more preferably comprises cobalt, iron, nickel, or combinations thereof. Most preferably, the catalytic metal comprises cobalt. The catalyst preferably contains a catalytically effective amount of the catalytic metal. It is to be understood that the amount of catalytic metal present in the catalyst may vary widely.

The catalyst preferably comprises the catalytic metal in an amount from about 1% to 50% by weight of the total catalyst composition (catalytic metal, support, and any optional promoters), preferably from about 10% to 50% by weight. It will be understood that % indicates percent throughout the present specification.

It will be further understood that, when the catalyst includes more than one supported metal, the catalytic metal, as termed herein, is the primary supported metal present in the catalyst. The primary supported metal is preferably determined by weight, that is the primary supported metal is preferably present in the greatest % by weight.

The catalytic metal contained by a catalyst according to a preferred embodiment of the present invention is preferably in a reduced metallic state before use of the catalyst in the Fischer-Tropsch synthesis. However, it will be understood that the catalytic metal can be present in the form of a metal compound, such as a metal oxide, a metal hydroxide, and the like. The catalytic metal is preferably uniformly dispersed throughout the support. It is also understood that the catalytic metal can also be present at the surface of the support, in particular on the surface or within a surface region of the support, or that the catalytic metal can be non-homogeneously dispersed onto the support.

Optionally, the present catalyst can also include at least one promoter known to those skilled in the art. The promoter may vary according to the catalytic metal. A promoter can be an element that also, in an active form, has catalytic activity, in the absence of the catalytic metal. Such an element will be termed herein a promoter when it is present in the catalyst in a lesser wt. % than the catalytic metal.

A promoter preferably enhances the performance of the catalyst. Suitable measures of the performance that may be enhanced include selectivity, activity, stability, lifetime, reducibility and resistance to potential poisoning by impurities such as sulfur, nitrogen, and oxygen. A promoter is preferably a Fischer-Tropsch promoter, that is an element or compound that enhances the performance of a Fischer-Tropsch catalyst in a Fischer-Tropsch process.

It will be understood that as contemplated herein, an enhanced performance of a promoted catalyst can be calculated according to any suitable method known to one of ordinary skill in the art. In particular, an enhanced performance can be given as a percent and computed as the ratio of the performance difference to the performance of a reference catalyst. The performance difference is between the performance of the promoted catalyst and the reference catalyst, wherein the reference catalyst is a similar corresponding catalyst having the nominally same amounts, e.g. by weight percent, of all components except the promoter. It will further be understood that, as contemplated herein, a performance can be measured in any suitable units. For example, when the performance is the productivity, the productivity can be measured in grams product per hour per liter reactor volume, grams product per hour per kilogram catalyst, and the like.

Suitable promoters vary with the catalytic metal and can be selected from Groups 1–15 of the Periodic Table of the Elements. A promoter can be in elemental form. Alternatively, a promoter can be present in an oxide compound. Further, a promoter may be present in an alloy containing the catalytic metal. Except as otherwise specified herein, a promoter is preferably present in an amount to provide a weight ratio of elemental promoter: elemental catalytic metal of from about 0.00005:1 to about 0.5:1, preferably, from about 0.0005:1 to about 0.25:1 (dry basis). When the promoter comprises a metal from Groups 7, 8, 9, and 10 of the Periodic Table, such as rhenium, ruthenium, platinum, or palladium, the weight ratio of elemental promoter: elemental catalytic metal may be between about 0.00005:1 and about 0.05:1.

Further, when the catalytic metal is cobalt, suitable promoters include Group 1 elements such as potassium (K), lithium (Li), sodium (Na), and cesium (Cs); Group 2 elements such as calcium (Ca), magnesium (Mg), strontium (Sr), and barium (Ba); Group 3 elements such as scandium (Sc), yttrium (Y), and lanthanum (La); Group 4 elements such as titanium (Ti), zirconium (Zr), and hafnium (Hf); Group 5 elements such as vanadium (V), niobium (Nb), and tantalum (Ta); Group 6 elements such as molybdenum (Mo) and tungsten (W); Group 7 elements such as rhenium (Re) and manganese (Mn); Group 8 elements such as ruthenium (Ru) and osmium (Os); Group 9 elements such as rhodium (Rd) and iridium (Ir); Group 10 elements such as platinum (Pt) and palladium (Pd); Group 11 elements such as silver (Ag) and copper (Cu); Group 12 elements such as zinc (Zn), cadmium (Cd), and mercury (Hg); Group 13 elements such as gallium (Ga), indium (In), thallium (Tl), and boron (B); Group 14 elements such as tin (Sn) and lead (Pb); and Group 15 elements such as phosphorus (P), bismuth (Bi), and antimony (Sb). When the catalytic metal is cobalt, the promoter preferably comprises rhenium, ruthenium, platinum, palladium, boron, silver, or combinations thereof.

When the cobalt catalyst includes rhenium, the rhenium is preferably present in the catalyst in an amount between about 0.001 and about 5% by weight, more preferably between about 0.01 and about 2% by weight, most preferably between about 0.2 and about 1% by weight.

When the cobalt catalyst includes ruthenium, the ruthenium is preferably present in the catalyst in an amount between about 0.0001 and about 5% by weight, more preferably between about 0.001 and about 1% by weight, most preferably between about 0.01 and about 1% by weight.

When the cobalt catalyst includes platinum, the platinum is preferably present in the catalyst in an amount between about 0.00001 and about 5% by weight, more preferably between about 0.0001 and about 1% by weight, and most preferably between about 0.0005 and about 1% by weight.

When the cobalt catalyst includes palladium, the palladium is preferably present in the catalyst in an amount between about 0.00001 and about 5% by weight, more preferably between about 0.0001 and about 2% by weight, most preferably between about 0.0005 and about 1% by weight.

When the cobalt catalyst includes silver, the catalyst preferably has a nominal composition including from about 0.05 to about 10% by weight silver, more preferably from about 0.07 to about 7% by weight silver, still more preferably from about 0.1 to about 5% by weight silver.

When the cobalt catalyst includes boron, the catalyst preferably has a nominal composition including from about 0.025 to about 2% by weight boron, more preferably from about 0.05 to about 1.8% by weight boron, still more preferably from about 0.075 to about 1.5% by weight boron.

By way of example and not limitation, when the catalytic metal is iron, suitable promoters include copper (Cu), potassium (K), silicon (Si), zirconium (Zr), silver (Ag), lithium (Li), sodium (Na), rubidium (Rb), cesium (Cs), magnesium (Mg), calcium (Ca), strontium (Sr), and barium (Ba). When the catalytic metal is iron, the promoter more preferably comprises potassium, copper, lithium, sodium, silver, magnesium, or combinations thereof. When the catalytic metal is iron, the catalyst may include potassium or lithium as a promoter; and alternatively or in combination, the catalyst may include copper or silver.

When the iron catalyst comprises lithium as a promoter, lithium is present in an amount preferably between about 0.05 wt % and about 5 wt % of lithium to total weight of catalyst; and most preferably, between about 0.5 wt % and about 2 wt %.

When the iron catalyst comprises silver as a promoter, silver is present in an amount preferably between about 0.001 wt % and about 5 wt % of silver to total weight of catalyst; more preferably between about 0.001 wt % and about 2 wt % of silver to total weight of catalyst; and most preferably between about 0.005 wt % and 1 wt % of silver to total weight of catalyst.

When the iron catalyst comprises potassium as a promoter, potassium is present in an amount preferably between about 0.0001 wt % and about 10 wt % of potassium to total weight of catalyst; more preferably, between about 0.0005 wt % and about 1 wt % of potassium to total weight of catalyst; and most preferably, between about 0.0005 wt % and about 0.5 wt % of potassium to total weight of support.

When the iron catalyst comprises calcium as a promoter, calcium is present in an amount preferably between about 0.001 wt % and about 4 wt % of calcium to total weight of catalyst; more preferably, between about 0.5 wt % and about 3 wt % of calcium to total weight of catalyst.

When the iron catalyst comprises copper as a promoter, copper is preferably present in an amount to provide a nominal catalyst composition including between about 0.1 wt. % and about 10 wt. % copper.

Alternatively, by way of example and not limitation, when the catalytic metal is ruthenium, suitable promoters include rhenium. When the ruthenium catalyst includes rhenium, the rhenium is preferably present in the catalyst in an amount between about 0.001 and about 1% by weight, more preferably between about 0.01 and about 0.5% by weight, still more preferably between about 0.05 and about 0.5% by weight.

As used herein, a nominal composition is preferably a composition specified with respect to an active catalyst. The active catalyst can be either fresh or regenerated. The nominal composition can be determined by experimental elemental analysis of an active catalyst. Alternatively, the nominal composition can be determined by numerical analysis from the known amounts of catalytic metal, promoter, and support used to make the catalyst. It will be understood that the nominal composition as determined by these two methods will typically agree within conventional accuracy.

Further, as used herein, it will be understood that each of the ranges, such as of ratio or weight %, herein is inclusive of its lower and upper values.

Catalyst Preparation

The catalyst is preferably prepared by depositing a compound of the catalytic metal on the support material to form a composite material and calcining the composite material to form the catalyst. The catalyst is hydrothermally stable in contact with a feed stream at high temperatures in the presence of water. High temperatures can include temperatures greater than 190° C. The hydrothermally stable catalyst loses not more than 20% of its surface area and 15% of its pore volume when exposed to water vapor in the Fischer-Tropsch process. The present catalysts can be prepared by any of the methods known to those skilled in the art. By way of illustration and not limitation, methods of preparing a supported catalyst include impregnating a catalyst material onto the support, extruding the support material together with catalyst material to prepare catalyst extrudates, spray-drying the catalyst material and the support from a solution containing both, and/or precipitating the catalyst material onto a support. Accordingly, the supported catalysts of the present invention can be used in the form of powders, particles, pellets, monoliths, honeycombs, packed beds, foams, and aerogels. The catalyst material can include any one or combination of a catalytic metal, a precursor compound of a catalytic metal, a promoter, and a precursor compound of a promoter.

The most preferred method of preparation can vary among those skilled in the art depending, for example, on the desired catalyst particle size. Those skilled in the art are able to select the most suitable method for a given set of requirements.

One method of preparing a catalyst by impregnating a catalyst material onto a support includes impregnating the support with a solution containing the catalyst material. Suitable solvents include water and non-aqueous solvents (e.g., toluene, methanol, ethanol, and the like). Those skilled in the art will be able to select the most suitable solvent for a given catalyst material. The catalyst material can be in the form of a salt of a catalytic metal or promoter element. Thus, one method of preparing supported metal catalyst is by incipient wetness impregnation of the support with a solution of a soluble metal salt. Incipient wetness impregnation preferably proceeds by solution of a cobalt compound in a minimal amount of solvent sufficient to fill the pores of the support. Alternatively, the catalyst material can be in the form of a zero valent compound of a catalytic metal or promoter element. Thus, another preferred method is to impregnate the support with a solution of zero valent metal such as cobalt carbonyl (e.g. $Co_2(CO)_8$, $Co_4(CO)_{12}$) or the like. Multiple steps of impregnation might be necessary in order to achieve the desired amount of metal loading.

Another method of preparing a catalyst by impregnating a catalyst material onto a support includes impregnating the support with a molten salt of a catalytic metal or promoter. Thus, another method includes preparing the supported metal catalyst from a molten metal salt. One preferred method is to impregnate the support with a molten metal nitrate (e.g., $Co(NO_3)_2 \cdot 6H_2O$). A promoter compound can be impregnated separately from any cobalt, in a separate step. Alternatively, a promoter compound can be impregnated simultaneously with, e.g. in the same solution as, at least a portion of the catalytic metal.

When a catalyst material is impregnated as a precursor of the material, e.g. a salt or zero valent compound, those skilled in the art will be able to select the most suitable precursor.

By way of example and not limitation, suitable cobalt-containing precursor compounds include, for example, hydrated cobalt nitrate (e.g. cobalt nitrate hexahydrate), cobalt carbonyl, cobalt acetate, cobalt acetylacetonate, cobalt oxalate, and the like. Hydrated cobalt nitrate, cobalt carbonyl and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent.

Suitable rhenium-containing precursor compounds soluble in water are preferred and include, for example, perrhenic acid, ammonium perrhenate, rhenium pentacarbonyl chloride, rhenium carbonyl, and the like.

Suitable ruthenium-containing precursor compounds soluble in water include for example ruthenium carbonyl, $Ru(NH_3)_6.Cl_3$, Ru(III)2,4-pentanedionoate, ruthenium nitrosyl nitrate, and the like. Water-soluble ruthenium-containing precursor compounds are preferred.

Suitable platinum-containing precursor compounds soluble in water include, for example, $Pt(NH_3)_4(NO_3)_2$ and the like. Alternatively, the platinum-containing precursor can be soluble in an organic solvent, such as platinum acetyl acetonate soluble in acetone.

Suitable boron-containing precursor compounds soluble in water include, for example, boric acid, and the like. Alternatively, the boron-containing precursor can be soluble in an organic solvent.

Suitable silver-containing precursor compounds soluble in water include, for example, silver nitrate ($AgNO_3$) and the like. Alternatively, the silver-containing precursor can be soluble in an organic solvent.

Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

The impregnated support is preferably treated to form a treated impregnated support. The treatment can include drying the impregnated support. Drying the impregnated support preferably occurs at a temperature between 80 and 150° C. Typically, drying proceeds for from about 0.5 to 24 hours at a pressure of from about 1 to about 75 atm, more preferably from about 1 to about 10 atm, most preferably at about 1 atm.

Alternatively, or in combination, treating an impregnated support to form a treated impregnated support can include calcining the impregnated support. Calcination is preferably done in an oxidizing atmosphere. The calcination preferably achieves oxidation of any impregnated compound or salt of a supported material to an oxide compound of the supported material. The calcining is done at a temperature sufficient to convert the impregnated compound or salt to the oxide compound. Preferably, the temperature is between about 200° C. and about 900° C. More preferably, the temperature is between about 250° C. and about 500° C., most preferably between about 500° C. and about 900° C. Calcining proceeds from about 0.5 to 24 hours at a pressure of from about 1 to about 75 atm, more preferably from about 1 to about 10 atm, most preferably at about 1 atm. When the preparation of the catalyst proceeds via a multi-step impregnation of a catalytic metal on a boehmitic support, any calcining of the catalyst after any impregnation following the first one preferably proceeds at a temperature of not more than 500° C., preferably not more than 450° C., more preferably not more than 350° C. In this embodiment, there should be at least a first calcination and a last calcination, and the last calcination is performed at a temperature lower than that of the first calcination.

The impregnation of catalytic metal and any optional promoter on a support can proceed by multi-step impregnation, such as by two, three, or four impregnation steps. The method preferably comprises a multi-step incipient wetness impregnation, when the catalyst comprises more than 10 wt % of catalytic metal, particularly when the catalyst comprises between about 10 and 50 wt % of catalytic metal. Each impregnation step can include impregnation of any one or combination of catalytic metal and promoter. Each impregnation step can be followed by any of the above-described treatments of the impregnated support. In particular, each step of impregnating the support to form an impregnated support can be followed by treating the impregnated support to form a treated impregnated support. Thus, a multi-step impregnation can include multiple steps of drying and/or calcination. Each subsequent step of drying can proceed at a different temperature from any earlier steps of drying. Further, each subsequent step of calcination can proceed at a different temperature from any earlier steps of calcination. By way of example and not limitation, a multi-step impregnation can include calcining the support at a first temperature that is higher or equal to than the temperature for subsequent calcinations. For instance, a three-step impregnation process includes at least a portion of catalytic metal impregnated on a support material to form a first intermediate. The first intermediate is preferably dried. The dried first intermediate is preferably calcined to form a first calcined intermediate. The first calcined intermediate is impregnated by impregnating at least a second portion of catalytic metal on the first calcined intermediate to form a second intermediate. The second intermediate is preferably dried. The dried second intermediate is preferably calcined to form a second calcined intermediate. The second calcined intermediate is impregnated with at least a third portion of catalytic metal to form a third intermediate, which comprises the catalyst. Optionally, the catalyst comprising the third intermediate can be dried and/or calcined.

Typically, at least a portion of the metal(s) of the catalytic metal component of the catalysts of the present invention is present in a reduced state (i.e., in the metallic state). Therefore, it is normally advantageous to activate the catalyst prior to use by a reduction treatment in the presence of a reducing gas at an elevated temperature. The reducing gas preferably includes hydrogen. Typically, the catalyst is treated with hydrogen or a hydrogen-rich gas at a temperature in the range of from about 75° C. to about 500° C., for about 0.5 to about 50 hours at a pressure of about 1 to about 75 atm. Pure hydrogen may be used in the reduction treatment, as may a mixture of hydrogen and an inert gas such as nitrogen, or a mixture of hydrogen and other gases as are known in the art, such as carbon monoxide and carbon dioxide, may be used. Reduction with pure hydrogen or reduction with a mixture of hydrogen and carbon monoxide are preferred. The amount of hydrogen may range from about 1% to about 100% by volume.

Fischer-Tropsch Operation

A process for producing hydrocarbons preferably includes contacting a feed stream that includes carbon monoxide and hydrogen with the present catalyst. Alternatively or in combination, a process for producing hydrocarbons includes contacting a feed stream that includes carbon monoxide and hydrogen with a catalyst in a reaction zone so as to produce hydrocarbons, where the catalyst is a catalyst made according to the present invention.

The feed gas charged to the process for producing hydrocarbons includes hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, partial oxidation, or other processes known in the art. Preferably, the hydrogen is provided by free hydrogen, although some Fischer-Tropsch catalysts have sufficient water gas shift activity to convert some water and carbon monoxide to hydrogen and carbon dioxide, thus producing hydrogen for use in the Fischer-Tropsch process. It is preferred that the molar ratio of hydrogen to carbon monoxide in the feed be greater than 0.5:1 (e.g., from about 0.67 to 2.5). Preferably, when cobalt, nickel, and/or ruthenium catalysts are used, the feed gas stream contains hydrogen and carbon monoxide in a molar ratio of about 1.6:1 to 2.3:1. Preferably, when iron catalysts are used the feed gas stream contains hydrogen and carbon monoxide in a molar ratio between about 1.4:1 and 2.3:1. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia, hydrogen cyanide, and carbonyl sulfides.

The feed gas is contacted with the catalyst in a reaction zone. Mechanical arrangements of conventional design may be employed as the reaction zone including, for example, plug flow, continuous stirred tank, fixed bed, fluidized bed, slurry phase, slurry bubble column, reactive distillation column, or ebulliating bed reactors, among others, may be used. The size and physical form of the catalyst may vary, depending on the reactor in which it is to be used. Plug flow, fluidized bed, reactive distillation, ebulliating bed, and continuous stirred tank reactors have been delineated in "Chemical Reaction Engineering," by Octave Levenspiel, and are known in the art, as are slurry bubble column. A preferred slurry bubble column is described in co-pending commonly assigned U.S. patent application Ser. No. 10/193,357, hereby incorporated herein by reference.

When the reaction zone includes a slurry bubble column, the column preferably includes a three-phase slurry. Further, a process for producing hydrocarbons by contacting a feed stream including carbon monoxide and hydrogen with a catalyst in a slurry bubble column, preferably includes dispersing the particles of the catalyst in a liquid phase comprising the hydrocarbons so as to form a two-phase slurry; and dispersing the hydrogen and carbon monoxide in the two-phase slurry so as the form the three-phase slurry. Further, the slurry bubble column preferably includes a vertical reactor and dispersal preferably includes injection and distribution in the bottom half of the reactor.

The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions (standard pressure of 101 kPa and standard temperature of 0° C.). The reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C.; more preferably from about 205° C. to about 230° C. The reaction zone pressure is typically in the range of about 80 psia (552 kPa) to about 1000 psia (6,895 kPa), more preferably from 80 psia (552 kPa) to about 800 psia (5,515 kPa), and still more preferably from about 140 psia (965 kPa) to about 750 psia (5,170 kPa). Most preferably, the reaction zone pressure is from about 250 psia (1,720 kPa) to about 650 psia (4,480 kPa).

The products resulting from the process will have a wide range of molecular weights. Typically, the carbon number range of the product hydrocarbons will start at methane and continue to about 50 to 100 carbons or more per molecule as measured by current analytical techniques. The process is particularly useful for making hydrocarbons having five or more carbon atoms especially when the above-referenced preferred space velocity, temperature and pressure ranges are employed.

The wide range of hydrocarbons produced in the reaction zone will typically afford liquid phase products at the reaction zone operating conditions. Therefore, the effluent stream of the reaction zone will often be a mixed phase stream including liquid and gas phase products. The effluent gaseous stream of the reaction zone may be cooled to condense additional amounts of hydrocarbons and passed into a vapor-liquid separation zone separating the liquid and vapor phase products. The gaseous material may be passed into a second stage of cooling for recovery of additional hydrocarbons. The liquid material from the reaction zone together with any liquid from a subsequent separation zone may be fed into a fractionation column. Typically, a stripping column is employed first to remove light hydrocarbons such as propane and butane. The remaining hydrocarbons may be passed into a fractionation column where they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight down to desired products such as middle distillates and gasoline. The gas phase recovered from the reactor zone effluent stream after hydrocarbon recovery may be partially recycled if it contains a sufficient quantity of hydrogen and/or carbon monoxide.

Without further elaboration, it is believed that one skilled in the art can, using the description herein, utilize the present invention to its fullest extent. The following exemplary embodiments are to be construed as illustrative, and not as constraining the scope of the present invention in any way whatsoever.

EXAMPLES

Examples 1–5

Examples 1–5 illustrate commercially viable Fischer-Tropsch performance of various catalysts containing a boehmitic support.

The source of boehmite material, the identity of the reduction promoter, the weight percent of the reduction promoter, the weight percent of the catalytic metal, and the first calcination temperature after the first impregnation in a multi-step impregnation procedure were varied. In particular, between Examples 1 and 2 both the commercial source of the boehmite support material and the identity of the promoter differed. Further, between Examples 2 and 3 the weight percent of catalytic metal, the weight percent of promoter and the first calcination temperature differed.

Results for physical properties of the catalysts are shown in Table 1. The exemplary physical properties include BET surface area, pore volume, and average pore diameter. These results demonstrate that the catalysts possess physical properties known to be suitable for commercial Fischer-Tropsch operations.

Results for reactor performance of the catalysts are listed in Table 2. The exemplary indicators of performance include CO conversion, methane ($C_1$) content as a weight percent of hydrocarbons, and ($C_{5+}$) hydrocarbon productivity. A continuous fixed bed reactor system was used. These results demonstrate that the catalysts exhibit performance known to be suitable for commercial Fischer-Tropsch operations.

Examples 1–3

Catalyst Preparation

Example 1

Impregnation of Alcoa Hi Q®-10 Boehmite

Calcination at 490° C. After First Impregnation

Multi-step incipient wetness impregnation method was used. A solution was prepared by dissolving [Ru(NO)(NO$_3$)$_3$.xH$_2$O], cobalt nitrate hexahydrate [Co(NO$_3$)$_2$.6H$_2$O], and boric acid [H$_3$BO$_3$] in water. Hi Q®-10 boehmite support material from Alcoa (Houston, Tex.) was impregnated by using a portion of the solution to achieve incipient wetness. The prepared catalyst was then dried for 16 hours in an oven at a temperature of 82° C. The dried catalyst was then calcined in air in a calcining chamber by raising the temperature of the calcining chamber at a heating rate of 1° C./min up to 490° C. and holding at this temperature for 4 hours. The above procedure was repeated to achieve a nominal composition of 20 weight % Co, 0.1 weight % Ru and 0.5 weight % B, calculated as the percent of the total weight of the catalyst. However, in the subsequent calcination, a lower calcination temperature of 240° C. was used.

Example 2

Impregnation of Spray Dried Sasol Dispal® 23N4-80 Boehmite

Calcination at 490° C. After First Impregnation

As received, boehmite (Dispal® 23N4-80) from Sasol North America Inc. (Houston, Tex.) was dispersed in water and then spray-dried and finally dried at 200° C. for 2 hours.

Multi-step incipient wetness impregnation method was used. A solution was prepared by dissolving tetraamineplatinum(II) nitrate [(NH$_3$)$_4$Pt(NO$_3$)$_2$], cobalt nitrate hexahydrate [Co(NO$_3$)$_2$.6H$_2$O], and boric acid [H$_3$BO$_3$] in water. The above spray-dried Dispal® 23N4-80 boehmite support was impregnated by using a portion of the solution prepared above to achieve incipient wetness. The prepared catalyst was then dried for 16 hours in an oven at a temperature of about 82° C. The dried catalyst was then calcined in air in a calcining chamber by raising the temperature of the calcining chamber at a heating rate of 1° C./min up to 490° C. and holding at this temperature for 4 hours. The above procedure was repeated to achieve a nominal composition of 20 weight % Co, 0.02 weight % Pt and 0.5 weight % B, calculated as the percent of the total weight of the catalyst. However, in the subsequent calcination, a lower calcination temperature of 240° C. was used.

Example 3

Impregnation of Spray Dried Sasol Dispal® 23N4-80

Calcination at 750° C. After First Impregnation

As received, boehmite from Sasol (Dispal® 23N4-80) was dispersed in water and then spray-dried and finally dried at 200° C. for 2 hours.

Multi-step incipient wetness impregnation method was used. A solution was prepared by dissolving tetraamineplatinum(II) nitrate [(NH$_3$)$_4$Pt(NO$_3$)$_2$], cobalt nitrate hexahydrate [Co(NO$_3$)$_2$.6H$_2$O], and boric acid [H$_3$BO$_3$] in water. The above spray-dried Dispal® 23N4-80 boehmite support was impregnated by using a portion of the solution prepared above to achieve incipient wetness. The prepared catalyst was then dried for 16 hours in an oven at a temperature of 82° C. The dried catalyst was then calcined in air in a calcining chamber by raising the temperature of the calcining chamber at a heating rate of 1° C./min up to 750° C. and holding at this temperature for 4 hours. The above procedure was repeated to achieve a nominal composition of 30 weight % Co, 0.03 weight % Pt and 0.5 weight % B, calculated as the percent of the total weight of the catalyst. However, in the subsequent calcination, a lower calcination temperature of 240° C. was used.

Example 4

Physical Properties

The BET surface area, pore volume, and average pore diameter of the catalysts of Examples 1–3 were determined from $N_2$ adsorption-desorption isotherms at 77 K on a Micromeritics ASAP 2000 equipment. Results are shown in Table 1.

TABLE 1

Properties of the Catalysts

| Example | Catalyst Composition | BET Surface Area, $m^2/g$ | Pore Volume, cc/g | Average Pore Diameter, nm |
|---|---|---|---|---|
| 1 | 20% Co/0.1Ru/0.5B/Al$_2$O$_3$ | 178 | 0.25 | 5.5 |
| 2 | 20% Co/0.02Pt/0.5B/Al$_2$O$_3$ | 136 | 0.23 | 6.9 |
| 3 | 30% Co/0.03Pt/0.5B/Al$_2$O$_3$ | 86 | 0.17 | 8.2 |

Example 5

Fischer-Tropsch Performance

The catalysts of Examples 1–3 were tested in a laboratory fixed bed reactor. Each catalyst was activated in situ by heating the catalyst to 350° C. with a heating rate of 2° C./min and holding at 350° C. for 16 hours in flowing hydrogen gas at 600 sccm (standard cubic centimeter per minute). The reaction conditions included a temperature of 220° C., a pressure of 350 psig (2,515 KPa), a space velocity of 6 normal liters per hour per gram catalyst, and a molar hydrogen to carbon monoxide ratio in the feed stream of 2, with the exception that the 24 hour data points for the catalysts of Examples 2 and 3 were collected at a reactor temperature of 210° C. The carbon monoxide conversion (in mole %), the $C_{5+}$ productivity, and the methane ($C_1$) weight percent as a weight % of hydrocarbon product were measured at different reaction times on stream (TOS). Results are reported in Table 2.

TABLE 2

Laboratory Fixed-Bed Fischer-Tropsch Synthesis Performance

| Catalyst | TOS, h | CO Conversion, % | $C_1$, wt. % | $C_{5+}$ Productivity, g/h/kgcat |
|---|---|---|---|---|
| Example 1 | 24 | 73.9 | 9.6 | 738.7 |
| | 53 | 68.7 | 9.9 | 682.6 |
| | 71 | 68.5 | 9.9 | 681.8 |
| | 95 | 68.5 | 9.9 | 682.2 |
| Example 2 | 24 | 46.9 | 8.1 | 474.8 |
| | 48 | 80.2 | 8.5 | 803.9 |
| | 72 | 77.1 | 8.8 | 767.0 |
| | 96 | 74.7 | 9.0 | 741.2 |
| Example 3 | 24 | 60.7 | 7.8 | 623.3 |
| | 48 | 88.5 | 8.9 | 889.8 |
| | 72 | 84.4 | 9.0 | 847.4 |

Examples 6–12

Examples 6–12 further illustrate commercially viable Fischer-Tropsch performance of various catalysts derived from a boehmitic support.

The same source of boehmite material, amounts and identities of promoters and catalytic metal were used.

The solvents for the first impregnation and the presence or absence of preheating of the boehmite material were varied. In particular, examples 6 and 7 include a first aqueous impregnation and excluded preheating. Further, examples 8 and 9 included a first non-aqueous impregnation and excluded preheating. Still further, example 10 included a first aqueous impregnation and included preheating the boehmite at 325° C. The preheating rendered the boehmite substantially non-dispersible in water.

SEM micrographs of the catalysts are shown in FIGS. 1–5. A comparison of FIG. 5 with FIGS. 3 and 4 demonstrates that less agglomeration is achieved when the boehmite is heated prior to the first impregnation than when the preheating is excluded. A comparison of FIGS. 3 and 4 with FIGS. 1 and 2 demonstrates that slightly less agglomeration is achieved when the boehmite is impregnated with a first non-aqueous solution than when the boehmite is impregnated with a first aqueous solution. A comparison between FIG. 5 and FIGS. 3 and 4 demostrates that less agglomeration is achieved by preheating the boehmite than by impregnating the boehmite with a first non-aqueous solution.

Results for reactor performance of the catalysts are listed in Table 3. The exemplary indicators of performance include CO conversion, methane ($C_1$) as a weight percent of hydrocarbons, and $C_{5+}$ hydrocarbon productivity. A continuous fixed bed reactor system was used. These results demonstrate that the catalysts exhibit performance known to be suitable for commercial Fischer-Tropsch operations.

Examples 6–10

Catalyst Preparation

Example 6

Aqueous First Impregnation Solution

As received, boehmite (Dispal® 23N4-80) from Sasol (Sasol North America Inc. located in Houston, Tex.) was dispersed in water and then spray-dried and finally dried at 200° C. for 2 hours.

A multi-step incipient wetness impregnation method was used. A solution was prepared by dissolving $Co(NO_3)_2 \cdot 6H_2O$, $(NH_3)_4Pt(NO_3)_2$ and $H_3BO_3$ in water. The above spray-dried Dispal®23N4-80 boehmite alumina support was impregnated by using a portion of the solution prepared above to achieve incipient wetness. The prepared catalyst was then dried for 16 hours in an oven at a temperature of about 82° C. The dried catalyst was then calcined in air in a calcining chamber by raising the temperature of the calcining chamber at a heating rate of 1° C./min up to 490° C. and holding at this temperature for 4 hours. The above procedure was repeated to achieve a nominal composition of 30 weight % Co, 0.02 weight % Pt and 0.5 weight % B, calculated as the percent of the total weight of the catalyst. However, in the subsequent calcination, a lower calcination temperature of 240° C. was used.

Example 7

Aqueous First Impregnation Solution

The catalyst of Example 3 was used.

Example 8

Non-aqueous First Impregnation Solution

As received, boehmite from Sasol (Dispal® 23N4-80) was dispersed in water and then spray-dried and finally dried at 200° C. for 2 hours.

A multi-step incipient wetness impregnation method was used. To avoid partial 'dissolution' of the particles during the first impregnation step, we have employed for this step a non-aqueous impregnation technique. First, a portion of solution was prepared by dissolving $Co(NO_3)_2 \cdot 6H_2O$, $(NH_3)_4Pt(NO_3)_2$ and $H_3BO_3$ in acetone. The above spray-dried Dispal® 23N4-80 boehmite alumina support was impregnated using the solution prepared above to achieve incipient wetness. The prepared catalyst was then dried for 16 hours in an oven at a temperature of about 82° C. The dried catalyst was then calcined in air in a calcining chamber by raising the temperature of the calcining chamber at a heating rate of 1° C./min up to 750° C. and holding at this temperature for 4 hours. Next, a second portion of the solution was prepared by dissolving $Co(NO_3)_2 \cdot 6H_2O$, $(NH_3)_4Pt(NO_3)_2$ and $H_3BO_3$ in water. Second impregnation was carried out by using a portion of the solution prepared above to achieve incipient wetness. Impregnation with a portion of the aqueous solution described above was repeated to achieve a nominal composition of 30 weight % Co, 0.02 weight % Pt and 0.5 weight % B, calculated as the percent of the total weight of the catalyst. However, in the subsequent calcination, a lower calcination temperature of 240° C. was used.

Example 9

Non-aqueous First Impregnation Solution

As received, boehmite from Sasol (Dispal® 18N4-80) was dispersed in water and then spray-dried and finally dried at 200° C. for 2 hours.

A multi-step incipient wetness impregnation method was used. To avoid partial 'dissolution' of the particles during the first impregnation step, we have employed for this step a non-aqueous impregnation technique. First, a portion of solution was prepared by dissolving $Co(NO_3)_2 \cdot 6H_2O$, $(NH_3)_4Pt(NO_3)_2$ and $H_3BO_3$ in acetone. The above spray-dried Dispal® 18N4-80 boehmite alumina support was impregnated using the solution prepared above to achieve incipient wetness. The prepared catalyst was then dried for 16 hours in an oven at a temperature of about 82° C. The dried catalyst was then calcined in air by raising its temperature at a heating rate of 1° C./min to 750° C. and holding at this temperature for 4 hours. Next, a second portion of solution was prepared by dissolving $Co(NO_3)_2 \cdot 6H_2O$, $(NH_3)_4Pt(NO_3)_2$ and $H_3BO_3$ in water. Second impregnation was carried out by using a portion of the solution prepared above to achieve incipient wetness. Impregnation with a portion of the aqueous solution described above was repeated to achieve a nominal composition of 30 weight % Co, 0.02 weight % Pt and 0.5 weight % B, calculated as the percent of the total weight of the catalyst. However, in the subsequent calcination, a lower calcination temperature of 240° C. was used.

Example 10

Preheating of Boehmite Before First Impregnation

As received, boehmite from Sasol (Dispal® 18N4-80) was dispersed in water and then spray-dried and finally dried at 325° C. for 2 hours.

A multi-step incipient wetness impregnation method was used. A solution was prepared by dissolving $Co(NO_3)_2 \cdot 6H_2O$, $(NH_3)_4Pt(NO_3)_2$ and $H_3BO_3$ in water. The above spray-dried Dispal® 18N4-80 boehmite alumina support was impregnated by using a portion of the solution prepared above to achieve incipient wetness. The prepared catalyst was then dried for 16 hours in an oven at a temperature of about 82° C. The dried catalyst was then calcined in air by raising its temperature at a heating rate of 1° C./min to 750° C. and holding at this temperature for 4 hours. Impregnation with a portion of the aqueous solution described above was repeated to achieve a nominal composition of 30 weight % Co, 0.02 weight % Pt and 0.5 weight % B, calculated as the percent of the total weight of the catalyst. However, in the subsequent calcination, a lower calcination temperature of 240° C. was used.

Example 11

Microscopic Properties

Scanning electron microscopy using conventional techniques was performed on the catalysts of Examples 6–10.

The SEM micrographs of the catalysts of Examples 6, 7, 8, 9 and 10 are shown in FIGS. 1–5 respectively. As seen on FIGS. 1–5, Co is uniformly distributed, but there is a thin layer (rim) of cobalt on the outer surface, resulting from the agglomeration of the cobalt particles caused by the partial 'dissolution' of the boehmite. As seen on FIG. 5, catalyst prepared using the boehmitic support dried at 325° C. showed uniform distribution of cobalt with basically no rim.

Figure 2:
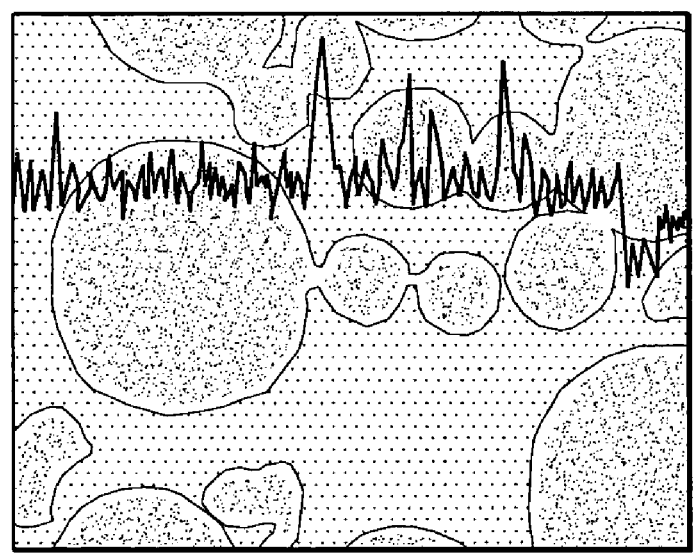
FIG. 2 is a SEM micrograph of another catalyst prepared by aqueous impregnation of dispersible boehmite.
Figure 3A:
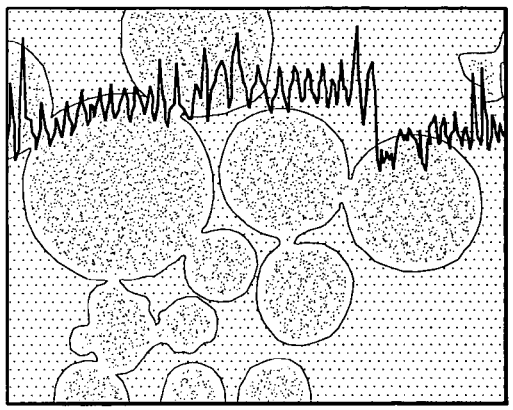
FIG. 3 is a SEM micrograph of a catalyst prepared by a first non-aqueous impregnation of dispersible boehmite followed by aqueous impregnation.
Figure 3B:
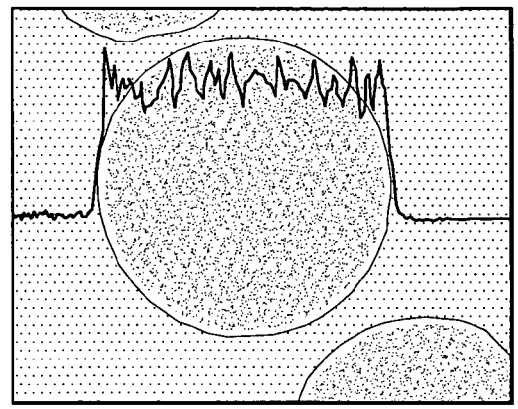
Figure 4A:
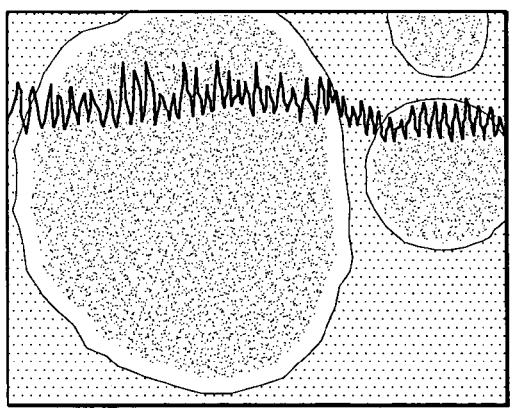
FIG. 4 is a SEM micrograph of another catalyst prepared by a first non-aqueous impregnation of dispersible boehmite followed by aqueous impregnation.
Figure 4B:
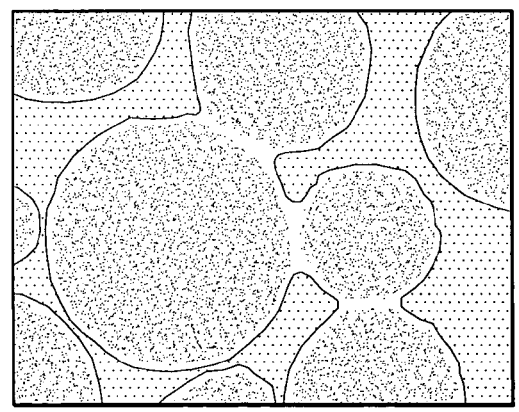
Figure 5A:
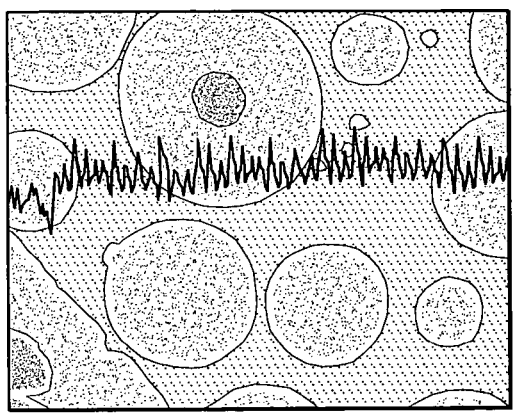
FIG. 5 is a SEM micrograph of a catalyst prepared by an aqueous impregnation of non-dispersible boehmite.
Figure 5B:
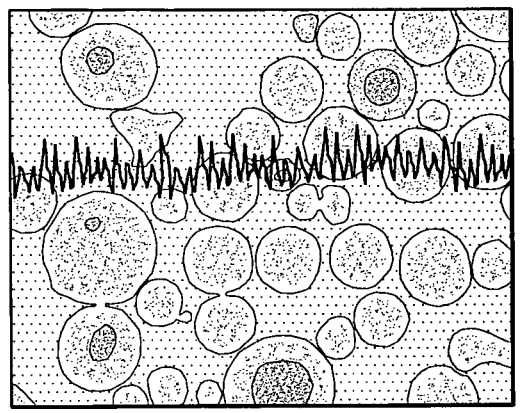

A comparison of FIG. 5 with FIGS. 1 and 2 demonstrates that less agglomeration is achieved when the boehmite is heated prior to the first impregnation than when the preheating is excluded. A comparison of FIGS. 3 and 4 with FIGS. 1 and 2 demonstrates that slightly less agglomeration is achieved when the boehmite is impregnated with a first non-aqueous solution than when the boehmite is impregnated with a first aqueous solution. A comparison between FIG. 5 and FIGS. 3 and 4 demonstrates that less agglomeration is achieved by preheating the boehmite than by impregnating the boehmite with a first non-aqueous solution.

Example 12

Fischer-Tropsch Performance

The catalysts of Examples 6–10 were tested in a laboratory fixed bed reactor. Each catalyst was activated in situ by heating the catalyst to 350° C. with a ramp of 2° C./min and holding for 16 hours in flowing hydrogen gas. The reaction conditions included a temperature of 220° C., a pressure of 350 psig (2,514 kPa), a space velocity of 6 normal liters per hour per gram catalyst, and a molar ratio of hydrogen to carbon monoxide in the feed stream of 2. The carbon monoxide conversion (mol %), the $C_{5+}$ productivity, and the methane ($C_1$) weight percent as a weight % of hydrocarbon product were measured at different reaction times on stream (TOS). Results are reported in Table 3.

TABLE 3

Laboratory Fixed-Bed Fischer-Tropsch Synthesis Performance for Examples 6–10

| Catalyst | Catalyst Composition | TOS, h | T, ° C. | CO, Conv. % | $C_1$, Wt. % | $C_5^+$, g/h/kgcat |
|---|---|---|---|---|---|---|
| Example 6 | 30% Co/0.03% Pt/0.5% B/$Al_2O_3$ | 96 | 220 | 89.1 | 9.3 | 878.3 |
| Example 7 | 30% Co/0.03% Pt/0.5% B/$Al_2O_3$ | 72 | 220 | 84.4 | 9.0 | 847.4 |
| Example 8 | 30% Co/0.03% Pt/0.5% B/$Al_2O_3$ | 96 | 220 | 62.1 | 8.9 | 615.0 |
| Example 9 | 30% Co/0.03% Pt/0.5% B/$Al_2O_3$ | 96 | 220 | 75.3 | 9.2 | 750.8 |
| Example 10 | 30% Co/0.03% Pt/0.5% B/$Al_2O_3$ | 96 | 220 | 66.2 | 8.7 | 663.1 |

Examples 13–14

Examples 13–14 illustrate that upon preheating of the boehmite, the material obtained remains essentially boehmite. The X-ray diffraction (XRD) data shown in FIG. 6 demonstrates the existence of boehmite peaks and the absence of discernible alumina peaks. It was observed by the present inventors that the boehmite obtained by preheating at 325° C. is non-dispersible boehmite, where non-dispersible refers to non-dispersion in aqueous solution. It is believed by the Applicants that preheating boehmite at a temperature between about 250° C. and 350° C. produces substantially non-dispersible boehmite.

Example 13

Preparation of Non-dispersible Boehmite

As received, boehmite from Sasol (Dispal® 18N4-80) was dispersed in water and then spray-dried and finally dried at 325° C. for 2 hours to obtain preheated boehmite.

Example 14

X-ray Properties of Non-dispersible Boehmite Support Material

An X-ray diffraction spectrum of the support of Example 13 was obtained for the support using conventional techniques.

Figure 6:
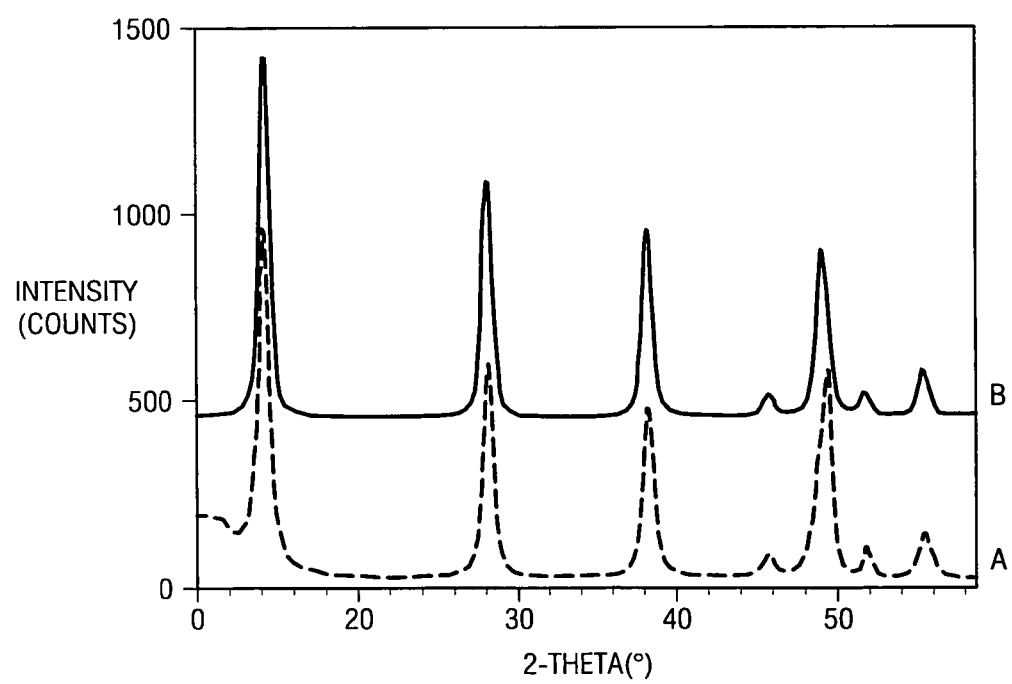
FIG. 6 is a X-Ray Diffraction (XRD) spectrum of the non-dispersible boehmite used to prepare the catalyst shown in FIG. 5.

Results are shown in FIG. 6. A simulated diffraction pattern for boehmite is shown displaced in the same figure. It can be seen that the preheated boehmite has the diffraction peaks characteristic of boehmite. Further, characteristic gamma-alumina peaks are not observable.

Examples 15–21

Catalyst Preparation

Examples 15–21 further illustrate commercially viable Fischer-Tropsch performance of various catalysts derived from a boehmite support, and as for comparison purposes only, one catalyst derived from a gamma-alumina support. The same sources of boehmite materials (Alcoa, Sasol), amounts and identities of promoters and catalytic metal were used.

Example 15

A boehmite support material commercially available from Alcoa, Inc. (Houston, Tex.) under the trade name Hi Q®-502-02® was first pretreated. Spray-drying comprises mixing the boehmite material in a solvent, preferably in deionized water to achieve a solid content between about 35% by weight; passing the mixture through a Mobile Minor spray-drier [type H, Model 2000, from Niro Inc.] with an inlet temperature of about 250° C. and an outlet temperature of about 100° C., such that the spray-drier had a solid outlet flow between about 40 g/min to 80 g/min. To finish the pretreatment, the spray-dried boehmite material was then preheated (i.e., calcined in air) at 325° C. for 2 hours at atmospheric pressure.

A multi-step aqueous incipient wetness impregnation method was used to prepare a Fischer-Tropsch catalyst. A solution was prepared by combining cobalt nitrate hexahydrate $[Co(NO_3)_2 \cdot 6H_2O]$, tetraamineplatinum(II) nitrate $[(NH_3)_4Pt(NO_3)_2]$, and boric acid $[H_3BO_3]$. The pretreated boehmite support material was impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 750° C., followed by holding at this temperature for 4 hours. The above procedure was repeated to obtain the following loading of Co, Pt, and B on the support: 30 wt. % Co; 0.03 wt. % Pt; and 0.5 wt. % B, wherein the weight % is based on the total weight of the final catalyst. However, in the subsequent calcination(s), a lower calcination temperature of 240° C. was used.

Example 16

The procedure of Example 15 was followed except that a boehmite material Dispal® 23N4-80 commercially available from Sasol North America Inc. (Houston, Tex.) was used to prepare the Fischer-Tropsch catalyst.

Example 17

The procedure of Example 15 was followed except that a boehmite material Dispal® 18N4-80 commercially available from Sasol was used to prepare the Fischer-Tropsch catalyst.

Example 18

The procedure of Example 15 was followed except that a boehmite material Dispal® 14N4-80 commercially available from Sasol was used to prepare the Fischer-Tropsch catalyst.

Example 19

The procedure of Example 15 was followed except that a boehmite material Hi Q®-180E commercially available from Alcoa, Inc. (Houston, Tex.) was used to prepare the Fischer-Tropsch catalyst.

Example 20

The procedure of Example 15 was followed except that a boehmite material Hi Q®-10 commercially available from Alcoa was used to prepare the Fischer-Tropsch catalyst.

Example 21

Catalyst Derived from a Gamma-alumina Support

A multi-step aqueous incipient wetness impregnation method was used to prepare a Fischer-Tropsch catalyst. First, a solution was prepared by combining cobalt nitrate hexahydrate $[Co(NO_3)_2 \cdot 6H_2O]$, tetraamineplatinum(II) nitrate $[(NH_3)_4Pt(NO_3)_2]$, and boric acid $[H_3BO_3]$. A gamma-alumina support material Puralox®/Catalox® SCCa 5/150 was purchased from Sasol. The gamma-alumina support was impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 240° C., followed by holding at this temperature for 4 hours. The above procedure was repeated to obtain the following loading of Co, Pt, and B on the gamma-alumina support: 25 wt. % Co; 0.03 wt. % Pt; and 0.5 wt. % B, wherein the weight % is based on the total weight of the final catalyst.

Example 22

Attrition Resistance

During the preparation of Example 17, the attrition resistance of the support material was tested before and after pretreatment using the ASTM method D-5757-95. After the pretreatment the boehmite support had a lower attrition index (1.1), compared to the untreated boehmite support (3.2), indicating that the pretreated support yielded a more attrition resistant support. Since the deposition of active metals and promoters does not affect greatly the attrition resistance of the deposited support, it is expected that the prepared catalyst with a pretreated boehmite support would have better attrition resistance than the catalysts made with boehmite supports without pretreatment.

Example 23

Characteristics of Boehmite Support Materials

Several properties of the boehmite support materials and most of the Fischer-Tropsch catalysts prepared therefrom in Examples 15–20 were measured, as shown in respective Tables 4 and 5 below. Those same properties of the gamma-alumina and of the Fischer-Tropsch catalyst prepared therefrom in Example 21 are also shown in both tables.

The average crystallite size and crystallite cobalt phase were both determined by X-Ray Diffraction (XRD). The XRD method is disclosed for example in Klug & Alexander ["X-ray diffraction procedures for polycrystalline and amorphous materials," John Wiley & Sons, $2^{nd}$ Edition, 1974], which includes the formula that was used to calculate the average crystallite size (see page 656).

The BET surface area, average pore volume, and average pore size (diameter) were measured by the BJH desorption method using $N_2$ as the adsorptive of commercially available gamma-alumina ($\gamma$-$Al_2O_3$) and boehmite catalyst supports. Surface area and pore size distribution are obtained on a Micromeritics TriStar 3000 analyzer after degassing the sample at 190° C. in flowing nitrogen for five hours. Surface area is determined from ten points in the nitrogen adsorption isotherm between 0.05 and 0.3 relative pressure and calculating the surface area by the standard BET procedure. Pore size distribution is determined from a minimum of 30 points in the nitrogen desorption isotherm and calculated using the BJH model for cylindrical pores. The instrument control and calculations are performed using the TriStar software and are consistent with ASTM D3663-99 "Surface Area of Catalysts and Catalyst Carriers," ASTM D4222-98 "Determination of Nitrogen Adsorption and Desorption Isotherms of Catalysts by Static Volumetric Measurements," and ASTM D4641-94 "Calculation of Pore Size Distributions of Catalysts from Nitrogen Desorption Isotherms." The initial surface area (A) of the catalyst is the surface area of the catalyst structure prior to contact of reactant gas. The pore volume (V) of the catalyst ($N_2$ as adsorptive) is measured and calculated using the method described above. Average size (diameter) based on $N_2$ adsorptive is calculated as 4V/A.

TABLE 4

Support Characteristics

| Support Type | Support Source | Support Avg. Crystallite Size, nm | Support BET Surface Area, $m^2/g$ | Support Avg. Pore Volume, cc/g | Support Avg. Pore size, nm |
|---|---|---|---|---|---|
| Boehmite Hi Q ®-10 | Alcoa | 4.2 | 279 | 0.37 | 5.3 |
| Boehmite Hi Q ®-502-02 | Alcoa | 8.4 | 285 | 0.24 | 3.4 |
| Boehmite Dispal ® 23N4-80 | Sasol | 10 | 186 | 0.30 | 6.5 |
| Boehmite Dispal ® 18N4-80 | Sasol | 15 | 133 | 0.30 | 9.1 |
| Boehmite Dispal ® 14N4-80 | Sasol | 25 | 79 | 0.36 | 19 |
| Boehmite Hi Q ®-180E | Alcoa | 34.5 | 22 | 0.16 | 30 |
| $\gamma$-alumina Puralox ®/Catalox ® SCCa 5/150 | Sasol | — | 137 | 0.48 | 14 |

TABLE 5

Catalysts Characteristics

| EX # | Support Type | Catalyst BET Surface Area, $m^2/g$ | Catalyst Pore Volume, ml/g | Avg. Pore Size of catalyst, nm | Avg. Crystallite Size of $Co_3O_4$ Phase in catalyst by XRD, nm |
|---|---|---|---|---|---|
| 15 | Boehmite Hi Q ®-502-02 | 63 | 0.12 | 7.3 | 16.1 |
| 16 | Boehmite Dispal ® 23N4-80 | 81 | 0.19 | 9.4 | 11.6 |
| 17 | Boehmite Dispal ® 18N4-80 | 75 | 0.20 | 10.6 | 12.5 |
| 18 | Boehmite Dispal ® 14N4-80 | 54 | 0.22 | 15 | 18.0 |
| 19 | Boehmite Hi Q ®-180E | 42 | 0.23 | 22 | 23.0 |
| 20 | Boehmite Hi Q ®-10 | 212 | — | 6.7 | — |
| 21 | Gamma-alumina Puralox ®/Catalox ® SCCa 5/150 | 94 | 0.25 | 10.8 | 14.2 |

Example 24

Catalyst Performance in a Fixed Bed Reactor

The Fischer-Tropsch catalysts prepared in Examples 15–21 were then separately placed in a fixed bed reactor to measure their catalytic performance in the conversion of synthesis gas to hydrocarbons under Fischer-Tropsch conditions. The fixed bed reactor was operated at a pressure of 360 psig a temperature of 220° C., and a space velocity of 6 normal liters per hour per gram of catalyst (NL/h/g catalyst). The performance (CO conversion, $C_1$ make, and $C_{5+}$ productivity) of these seven catalysts versus the time on stream (TOS) in the fixed bed reactor was then compared, as shown in Table 6 below.

Example 25

Catalyst Performance in a Continuously Stirred Tank Reactor

The Fischer-Tropsch catalysts prepared in Examples 15–17 and 20 were also separately placed in a continuously stirred tank reactor (CSTR) to facilitate the conversion of syngas to hydrocarbons during a Fischer-Tropsch process. The CSTR was operated at a pressure of 350 psig, a temperature of 225° C., and a space velocity of 9 NL/hr/g catalyst. The performance of these four catalysts in the CSTR were then compared, as shown in Table 7 below.

TABLE 6

Laboratory Fixed-Bed Fischer-Tropsch Synthesis Performance for Examples 15–21

| Ex No. | Support Type | Catalyst Composition on Support | TOS, h | CO conv., % | $C_1$, wt. % | $C_{5+}$, g/h/kg cat |
|---|---|---|---|---|---|---|
| 15 | Boehmite Hi Q ®-502-02 | 30% Co/0.03% Pt/0.5% B | 96 | 50 | 9.4 | 495 |
| 16 | Boehmite Dispal ® 23N4-80 | 30% Co/0.03% Pt/0.5% B | 86 | 61 | 8.2 | 621 |
| 17 | Boehmite Dispal ® 18N4-80 | 30% Co/0.03% Pt/0.5% B | 72 | 76 | 9.0 | 753 |
| 18 | Boehmite Dispal ® 14N4-80 | 30% Co/0.03% Pt/0.5% B | 96 | 69 | 9.3 | 686 |
| 19 | Boehmite Hi Q ®-180E | 30% Co/0.03% Pt/0.5% B | 48 | 47 | 9.4 | 465 |
| 20 | Boehmite Hi Q ®-10 | 20% Co/0.03% Pt/0.5% B | 95 | 69 | 9.9 | 682 |
| 21 | gamma-alumina Puralox ®/Catalox ® SCCa 5/150 | 25% Co/0.03% Pt/0.5% B | 96 | 62 | 10 | 604 |

Based on the results in Table 6, all the catalysts made from boehmite presented good Fischer-Tropsch performance. The catalysts resulting in greater amounts of $C_{5+}$ hydrocarbons, were the ones formed in Examples 16, 17, 18, and 20, which were derived from a boehmite having average crystallite sizes of 10 nm, 15 nm, 25 nm, and 4.2 nm, respectively. The catalysts of Example 15 and Example 19 yielded lower conversions of CO (below 60%) and lower productivity of

TABLE 7

Laboratory CSTR Fischer-Tropsch Performance for Examples 15–17 and 20.

| Example | Time on stream, hr | CO Conversion, % | $C_1$, wt. % | $C_{5+}$, g/hr/kgcat |
|---|---|---|---|---|
| Example 15: (30% Co/0.03% Pt/0.5% B made with Alcoa Boehmite Hi Q ®-502-02) | 27 | 13.3 | 9.2 | 212 |
| | 51 | 15.7 | 9.4 | 250 |
| | 75 | 17.8 | 9.6 | 280 |
| | 148 | 19.4 | 10.1 | 300 |
| Example 16: (30% Co/0.03% Pt/0.5% B made with Sasol Boehmite Dispal ® 23N4-80) | 84 | 35.5 | 10.9 | 534 |
| | 105 | 41.6 | 8.1 | 657 |
| | 130 | 39.4 | 8.6 | 615 |
| Example 17: (30% Co/0.03% Pt/0.5% B made with Sasol Boehmite Dispal ® 18N4-80) | 52 | 51.0 | 7.3 | 812 |
| | 80 | 49.4 | 7.4 | 798 |
| | 113 | 49.4 | 6.5 | 801 |
| | 147 | 42.0 | 8.1 | 656 |
| | 172 | 40.1 | 8.2 | 618 |
| Example 20: (20% Co/0.03% Pt/0.5% B made with Alcoa Boehmite Hi Q ®-10) | 35 | 39.4 | 14.7 | 350 |
| | 59 | 37.8 | 15.1 | 330 |
| | 83 | 34.1 | 16.7 | 282 |
| | 154 | 29.8 | 17.1 | 247 |
| | 178 | 22.9 | 23.4 | 157 |

$C_{5+}$ hydrocarbons (below 600 g/hr/kg Cat), than that obtained with Examples 16–18 and 20. As such, the crystallite size of the boehmite material may affect the catalyst performance.

Drawing attention to Table 7, the catalysts in Examples 16 and 17 generally yielded relatively higher % conversions of CO and relatively higher productivity of $C_{5+}$ hydrocarbons than the catalyst in Examples 15 and 20. This better performance of Examples 16 and 17 compared to Example 15 in a CSTR confirmed the results obtained in the fixed bed reactor as shown in Table 7; however, Example 20 seemed to perform better in a fixed bed reactor than in a CSTR.

Example 26

Hydrothermal Stability

The hydrothermal stability of some of the catalyst examples was performed using a steaming test. The steaming test comprised exposing a 1-g catalyst sample to about 15 g of water for 2 hours in an autoclave at a temperature of 225° C. and a pressure of 375 psig (about 2,690 kPa), conditions which are approximating the Fischer-Tropsch operating conditions. The catalyst sample was cooled down to room temperature (about 18–20° C.), then dried at about 80° C. for about 5 hours. Two samples (before and after steam treatment) were then analyzed for changes in surface area and pore size. Both were measured by the BJH desorption method as described above. The results for catalyst Examples 16, 20, and 21 are shown in Table 8. Both catalyst Examples 16 and 20 made from the boehmite materials showed better hydrothermal stability than the catalyst Example 21 made from gamma-alumina; both the surface area and pore size of the catalysts made from boehmite did not change as much after the steam treatment than those of the catalyst made with gamma-alumina.

TABLE 8

Hydrothermal stability of catalysts

| | | BET, m²/g catalyst | | | Pore size, nm | | |
|---|---|---|---|---|---|---|---|
| Cat. Ex. | Supports | Before steam | After steam | % change | Before steam | After steam | % change |
| 16 | Boehmite Dispal ® 23N4-80 | 86 | 96 | 11 | 8.2 | 7.4 | 13 |
| 20 | Boehmite Hi Q ®-10 | 212 | 227 | 7 | 6.7 | 6.1 | 9 |
| 21 | Gamma-alumina Puralox ®/ Catalox ® SCCa 5/150 | 94 | 113 | 20 | 10.8 | 9.1 | 16 |

The following patent applications filed concurrently herewith are hereby incorporated herein by reference: U.S. patent application Ser. No. 10/687,017, entitled "High Hydrothermal Stability Catalyst Support"; U.S. patent application Ser. No. 10/697,140, entitled "A Stabilized Transition Alumina Catalyst Support From Boehmite and Catalysts Made Therefrom"; and U.S. patent application Ser. No. 10/687022, entitled "Fischer-Tropsch Processes and Catalysts Using Stabilized Supports".

Should the disclosure of any of the patents, patent applications, and publications that are incorporated herein conflict with the present specification to the extent that it might render a term unclear, the present specification shall take precedence.

As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

While preferred embodiments of this invention have been shown and described, modifications thereof can be made by one skilled in the art without departing from the spirit or teaching of this invention. The embodiments described herein are exemplary only and are not limiting. Many variations and modifications of system and methods are possible and are within the scope of the invention. Accordingly, the scope of protection is not limited to the embodiments described herein, but is only limited by the claims that follow, the scope of which shall include all equivalents of the subject matter of the claims.

What is claimed is:

1. A process for producing hydrocarbons comprising
    (A) contacting a catalyst with a feed stream comprising carbon monoxide and hydrogen in a reaction zone, wherein the catalyst is made by a method comprising:
        (1) depositing a compound of a catalytic metal selected from Groups 8, 9, and 10 of the Periodic Table on a support material comprising boehmite to form a composite material; and
        (2) calcining the composite material to form the catalyst; and
    (B) converting at least a portion of the feed stream to hydrocarbon products with the catalyst;
    wherein the process comprises a multi-step incipient wetness impregnation in step (1), and wherein step (2) includes at least a first calcination and a last calcination;
    and wherein the last calcination is performed at a temperature lower than that of the first calcination.

2. The process according to claim 1 wherein the support material comprises synthetic boehmite, natural boehmite, pseudo-boehmite, or combinations thereof.

3. The process according to claim 1 wherein the support material comprises boehmite in the form of particles, wherein the particles have a size between about 20 microns and about 200 microns.

4. The process according to claim 1 wherein the support material campuses boehmite in the form of particles, wherein the particles have an average particle size between about 50 microns and about 90 microns.

5. The process according to claim 1 further comprising preheating the support material prior to step (1) at a temperature between about 250° C. and about 350° C.

6. The process according to claim 1 wherein the boehmite is substantially non-dispersible boehmite.

7. The process according to claim 1 wherein the boehmite is substantially dispersible boehmite.

8. The process according to claim 1 wherein calcining is done in an oxidizing atmosphere.

9. The process according to claim 1 wherein the catalytic metal comprises at least one metal from Group 8, 9, and 10 of the Periodic Table.

10. The process according to claim 1 wherein the catalytic metal comprises cobalt, iron, nickel, or combinations thereof.

11. The process according to claim 1 wherein the catalyst comprises between 10 wt % and 50 wt % a of the catalytic metal.

12. The process according to claim 1 wherein the catalytic metal comprises cobalt.

13. The process according to claim 12 wherein step (1) comprises:
(I) impregnating at least a first portion of the cobalt on the support material to form a first intermediate;
(II) optionally, drying the first intermediate;
(III) calcining the first intermediate to form a first calcined intermediate; and
(IV) impregnating the first calcined intermediate with at least a second portion of the cobalt to form said composite material.

14. The process according to claim 13 wherein the calcining in step (2) is performed at a temperature lower than or equal to the temperature used for the calcining in step (III).

15. The process according to claim 13 wherein step (I) is performed in a non-aqueous solvent.

16. The process according to claim 13 wherein the step (IV) is performed in an aqueous solvent.

17. The process according to claim 13 wherein step (IV) is accomplished to form a second intermediate, and wherein the method further comprises:
(V) optionally, drying the second intermediate;
(VI) calcining the second intermediate to form a second calcined intermediate;
(VII) impregnating the second calcined intermediate with at least a third portion of the cobalt to form a third intermediate; and
(VIII) optionally, drying the third intermediate.

18. The process according to claim 17 wherein the calcining step (VI) is performed at a temperature equal or lower than the temperature used for the calcining of step (III).

19. The process according to claim 1 wherein the catalyst is hydrothermally stable in contact with the feed stream at a high temperature greater than 190° C. in the presence of water.

20. The process according to claim 1 wherein step (2) occurs at a temperature between about 200° C. and about 900° C.

21. The process according to claim 1 wherein step (2) occurs at a temperature between about 250° C. and about 500° C.

22. The process according to claim 1 wherein step (2) occurs at a temperature between about 500° C. and about 900° C.

23. The process according to claim 1 wherein step (2) occurs at a temperature sufficient to convert the deposited cobalt compound to its oxide.

24. The process according to claim 1 wherein the support material comprises no anhydrous alumina.

25. The process according to claim 1 wherein the catalyst hydrothermally stable.

26. The process according to claim 1 further comprises depositing a promoter compound on the support material.

27. The process according to claim 1 wherein the catalytic metal comprises cobalt, and wherein the promoter metal comprises boron, silver, ruthenium, palladium, platinum, rhenium or combinations thereof.

28. The process according to claim 1 wherein the method of making the catalyst further comprises activating the catalyst in a reducing atmosphere.

29. The process according to claim 1 wherein the hydrocarbon products comprise hydrocarbons with at least 5 carbon atoms.

30. The process according to claim 1 wherein the catalyst has enhanced hydrothermal stability and comprises:
a support comprising aluminum;
the catalytic metal comprising iron, cobalt, or combinations thereof; and
a promoter comprising platinum, palladium, ruthenium, rhenium, silver, boron, copper, lithium, sodium, potassium, or any combinations thereof;
wherein the catalyst has a surface area and loses not more than 20% of its surface area when exposed to water vapor; and
wherein the catalyst is made by a method comprising:
(A) contacting the support material comprising boehmite with a catalytic metal-containing compound and a promoter compound to form a composite material; and
(B) calcining the composite material to obtain the catalyst.

31. The process according to claim 30 wherein the catalyst has a pore volume and loses not more than 15% of its pore volume when exposed to the water vapor.

32. The process according to claim 30 wherein the support material comprises no anhydrous alumina.

33. The process according to claim 30 wherein the boehmite is non-dispersible in aqueous solution.

34. The process according to claim 30 wherein the catalytic metal comprises cobalt; and the promoter comprises platinum, palladium, ruthenium, rhenium, silver, boron, or combinations thereof.

* * * * *

UNITED STATES PATENT AND TRADEMARK OFFICE
CERTIFICATE OF CORRECTION

PATENT NO. : 7,012,104 B2
DATED : March 14, 2006
INVENTOR(S) : Rafael L. Espinoza et al.

It is certified that error appears in the above-identified patent and that said Letters Patent is hereby corrected as shown below:

Column 28,
Line 52, "campuses" should be -- comprises --.

Column 30,
Line 8, should include -- wherein step (1) -- before "further comprises depositing a promoter compound on the support material.".

Signed and Sealed this

Sixth Day of June, 2006

JON W. DUDAS
*Director of the United States Patent and Trademark Office*